(12) United States Patent
Chapman et al.

(10) Patent No.: US 9,310,092 B2
(45) Date of Patent: Apr. 12, 2016

(54) ANALYTICS FOR OPTIMIZING USAGE OF COOLING SUBSYSTEMS

(71) Applicant: INTERNATIONAL BUSINESS MACHINES CORPORATION, Armonk, NY (US)

(72) Inventors: Jeffrey H. Chapman, Fairfax, VT (US); Michael R. Pelletier, Hinesburg, VT (US); Gregory L. Rieder, Jericho, VT (US); Daniel J. Tukey, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 13/686,427

(22) Filed: Nov. 27, 2012

(65) Prior Publication Data

US 2014/0148968 A1    May 29, 2014

(51) Int. Cl.
*G05D 23/00* (2006.01)
*F24F 11/00* (2006.01)

(52) U.S. Cl.
CPC ............ *F24F 11/006* (2013.01); *F24F 11/001* (2013.01); *F24F 2011/0061* (2013.01); *F24F 2011/0064* (2013.01); *F24F 2011/0067* (2013.01); *F24F 2011/0075* (2013.01); *Y02B 30/542* (2013.01)

(58) Field of Classification Search
CPC ......... F01P 1/00; F24F 11/006; F24F 11/001; F24F 2011/0064; F24F 2011/0067; F24F 2011/0075; F24F 2011/0061; Y02B 30/542
USPC ................................. 700/299, 300; 62/77, 98
See application file for complete search history.

(56) References Cited

U.S. PATENT DOCUMENTS

| 4,214,626 | A  | * | 7/1980 | Spethmann ..................... 62/181 |
| 7,890,215 | B2 |   | 2/2011 | Duncan |
| 8,020,390 | B2 |   | 9/2011 | Hamann et al. |
| 8,857,204 | B2 | * | 10/2014 | Reytblat ....................... 62/259.4 |
| 2005/0093183 | A1 | * | 5/2005 | Lewis et al. ..................... 261/94 |
| 2005/0275525 | A1 |   | 12/2005 | Ahmed |
| 2006/0065750 | A1 |   | 3/2006 | Fairless |
| 2007/0005191 | A1 |   | 1/2007 | Sloup et al. |
| 2010/0077776 | A1 |   | 4/2010 | Takenami et al. |
| 2010/0307171 | A1 |   | 12/2010 | Hamann et al. |

(Continued)

FOREIGN PATENT DOCUMENTS

| EP | 2200003 A1 | 6/2010 |
| GB | 2423573 A | 8/2006 |

OTHER PUBLICATIONS

International Search Report and Written Opinion for related PCT Application PCT/US13/56971 dated Jan. 29, 2014, 12 pages.

(Continued)

*Primary Examiner* — Mohammad Ali
*Assistant Examiner* — Ziaul Karim
(74) *Attorney, Agent, or Firm* — Bryan Bortnick; Andrew M. Calderon; Roberts Mlotkowski Safran & Cole, P.C.

(57) ABSTRACT

Methods and systems for systems and methods for optimizing usage of a free cooling subsystem are provided. The method includes collecting micro-climate data from one or more sensors surrounding a facility. The method also includes analyzing the micro-climate data and making a determination to operate a free cooling subsystem or a paid cooling subsystem based on the analysis of the micro-climate data.

17 Claims, 5 Drawing Sheets

(56) References Cited

U.S. PATENT DOCUMENTS

2012/0022700 A1   1/2012   Drees et al.
2014/0096946 A1*  4/2014   Rognli et al. ................ 165/209

OTHER PUBLICATIONS

Pang et al. "A framework for simulation-based real-time whole building performance assessment", Building and Environment 54 (Aug. 2012) 100-108, 9 pages.

* cited by examiner

ANALYTICS FOR OPTIMIZING USAGE OF COOLING SUBSYSTEMS

FIELD OF THE INVENTION

The invention relates to coolant systems and, more particularly, to systems and methods for optimizing usage of a free cooling subsystem.

BACKGROUND

A cooling system for providing conditioned air to a facility can include a paid cooling subsystem, a free cooling subsystem, a cooling tower subsystem, and/or one or more air handling units or process cooling units. The paid cooling subsystem may include one or more chillers (e.g., variable speed chillers, constant speed chillers, absorption chillers, etc.) and chilled fluid pumps. The free cooling subsystem may include heat exchangers and chilled fluid pumps. The cooling tower subsystem includes one or more cooling tower units and condenser fluid pumps.

Free cooling energy saving opportunities are strongly related to micro-climate weather conditions at the cooling tower subsystem. However, in a complex cooling system involving chiller sub-systems, i.e., paid cooling subsystems, free cooling subsystems and cooling tower subsystems, decisions need to be made as to how much of the total cooling system load can be accommodated by the free cooling subsystem and how much of the total cooling system load can be accommodated by the paid cooling subsystem. From a cost of operation, energy use and carbon footprint perspective it is desirable to maximize free cooling subsystem opportunities; however, paid cooling subsystems are often utilized when free cooling subsystem opportunities are available. This occurs as conditions at the cooling towers near the free cooling subsystem threshold temperatures and humidity conditions in the micro-climate.

Large industrial chillers require a fixed amount of time, e.g., 30 minutes, to reach stable operating conditions. However, operators tend to err on the safe side when weather conditions are marginal. That is, the operators tend to prematurely activate paid cooling subsystems when free cooling subsystems could be generating the needed heat rejection. Furthermore, the operators may make chiller run decisions based upon relatively long term regional weather forecast rather than micro-climate conditions at the cooling tower sub-systems.

Accordingly, there exists a need in the art to overcome the deficiencies and limitations described hereinabove.

SUMMARY

In a first aspect of the invention, a method comprises collecting micro-climate data from one or more sensors surrounding a facility. The method also comprises analyzing the micro-climate data and making a determination to operate a free cooling subsystem or a paid cooling subsystem based on the analysis of the micro-climate data.

In another aspect of the invention, a cooling system comprises one or more paid cooling subsystems and one or more free cooling subsystems and at least one sensor. The cooling system also comprises at least one component operable to analyze the micro-climate data and determine that free cooling opportunities are available. At least one sensor is located in a vicinity of a cooling tower and is configured to collect the micro-climate data.

In yet another aspect of the invention, a computer system for optimizing usage of a free cooling subsystem comprises a CPU, a computer readable memory and a computer readable storage media. The computer system comprises first program instructions to collect micro-climate data from one or more sensors. The computer system also comprises second program instructions to analyze the micro-climate data. The computer system further comprises third program instructions to operate the free cooling subsystem based on the analysis of the micro-climate data. The first, second, and third program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
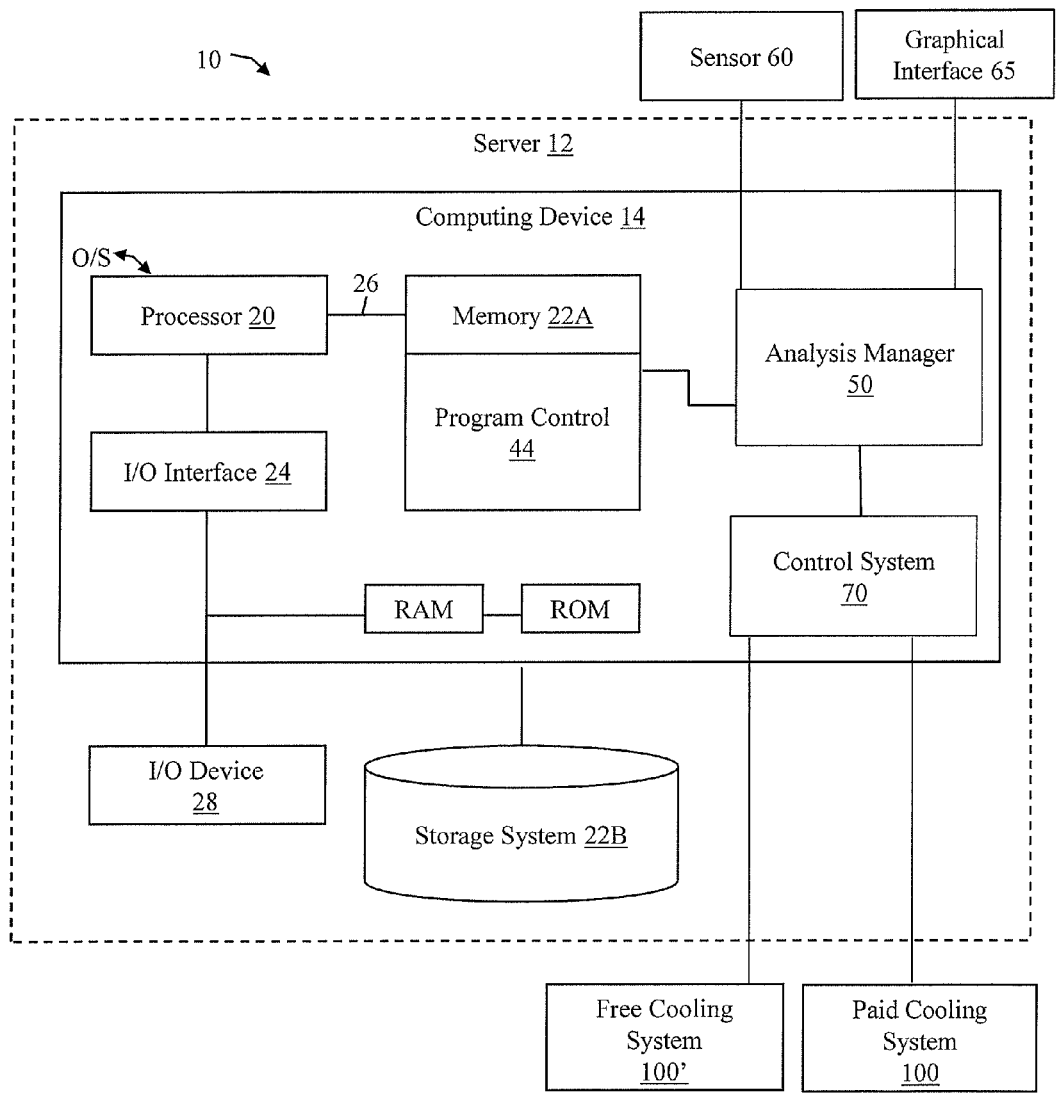
FIG. 1 shows an illustrative environment for implementing steps in accordance with aspects of the present invention.

The invention relates to coolant systems and, more particularly, to systems and methods for optimizing usage of a free cooling subsystem. The present invention can advantageously reduce energy waste, lower carbon footprint, standardize operations, improve occupant comfort and/or improve thermal characteristics of a process cooling unit. Additionally, the present invention can extend a useful life of equipment and reduce maintenance costs by reducing a usage of paid cooling subsystems.

Moreover, in accordance with aspects of the present invention, future ambient conditions at a cooling tower can be predicted in order to maximize the use of free cooling subsystems and to minimize the use of the paid cooling subsystems. As a result, the present invention can be used to improve the energy efficiency of the overall cooling system. That is, the present invention advantageously reduces the usage of the paid cooling subsystems by optimizing the use of free cooling subsystems. In this way, the present invention improves overall combined free cooling subsystem and paid cooling subsystem efficiency by maximizing free cooling usage and minimizing paid cooling usage.

The present invention advantageously provides for analytical techniques to optimize the use of free cooling subsystems in cooling systems, which include both free cooling subsystems and paid cooling subsystems. More specifically, the present invention can predict an optimal time to switch from the free cooling subsystems to the paid cooling subsystems and vice-versa. In this way, the present invention advantageously maximizes the use of free cooling subsystems to reduce overall operating costs by reducing the usage of paid cooling subsystems.

Free cooling opportunities are related to micro-climate conditions at a facility, e.g., a cooling tower. More specifically, the micro-climate conditions, e.g., a temperature, wet bulb temperature, a humidity level, atmospheric conditions, etc., at the cooling towers can be dramatically different from regional weather conditions due to variations in wind, topography, buildings, etc. In fact, chillers of the cooling system can create a micro-climate. Moreover, regional weather conditions can be analyzed on a 40 kilometer grid; whereas, the micro-climate conditions can be analyzed on a 100 meter grid. As a result, the micro-climate conditions more accurately reflect the conditions at the facility.

In embodiments, the present invention can use sensors to collect data of micro-climate conditions surrounding the facility, including at the chillers (which may cause their own micro-climate). In this way, the cooling systems can operate based on the micro-climate conditions or water temperature conditions, rather than regional climate conditions which may not accurately reflect conditions surrounding the facility.

Moreover, in accordance with aspects of the present invention, process flows can be used to analyze the data obtained from the sensor in real time and predict future conditions of the micro-climate. That is, real time data can be collected from sensors in the micro-climate of the cooling tower and the process flows can be used to analyze such data in order to describe current conditions and recent past conditions and to predict future conditions. The process flows can be tuned to specific operating conditions of the cooling system, e.g., an operating temperature, for example, 42° F. or 50° F. Moreover, the process flows can be used to determine a reaction time needed to switch from the free cooling subsystem to the paid cooling subsystem in a combined cooling system. That is, analytical results from the process flows can be used to allow just in time shifting of cooling loads from the free cooling subsystem to the paid cooling subsystem and vice-versa.

Furthermore, in embodiments, the analytical results can be displayed to an operator using a graphical interface, such that the operator can make decisions on when to start the paid cooling subsystem. As such, the operator can use the graphical interface in order to maintain a temperature specification of the cooling system while still maximizing the usage of the free cooling subsystem. Thus, the operator can use the analytical results to operate the free cooling subsystem when the paid cooling subsystem is not necessary. In further embodiments, the analytical results can be automatically fed into a control system, which can activate the paid cooling subsystem (or free cooling subsystem) without operator action. In this way, the present invention can maximum the use of the free cooling subsystem and reduce overall energy consumption.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or other known languages for programming control systems or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with an external I/O device/resource 28 and a storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls an analysis manager 50 and a control system 70 that are configured to perform the processes described herein. For example, the analysis manager 50 can analyze the microclimate conditions collected from one or more sensors 60. These sensors can be at or near a facility, including proximate to chillers of a cooling system which may cause their own micro-climate. More specifically, in embodiments, the analysis manager 50 can determine when to switch from the free cooling subsystem to the paid cooling subsystem and vice-versa based on the micro-climate conditions. For example, in embodiments, the analysis manager 50 can determine an amount of time necessary to switch from a free cooling subsystem 100' to a paid cooling subsystem 100 and activate the paid cooling subsystem based on such time. In this way, the usage of the free cooling subsystem 100' is maximized and the paid cooling subsystem 100 is activated with sufficient time to maintain the temperature specification of the cooling system. The analysis manager 50 can also generate analytical results which can be displayed on a graphical interface 65. In further embodiments, the analytical results can also be provided to the control system 70, which is configured to automatically switch between the free cooling subsystem 100' and the paid cooling subsystem 100 based on the analytical results.

The analysis manager 50 can be implemented as one or more program code in the program control 44 stored in memory 22A as separate or combined modules. Additionally, the analysis manager 50 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2A:
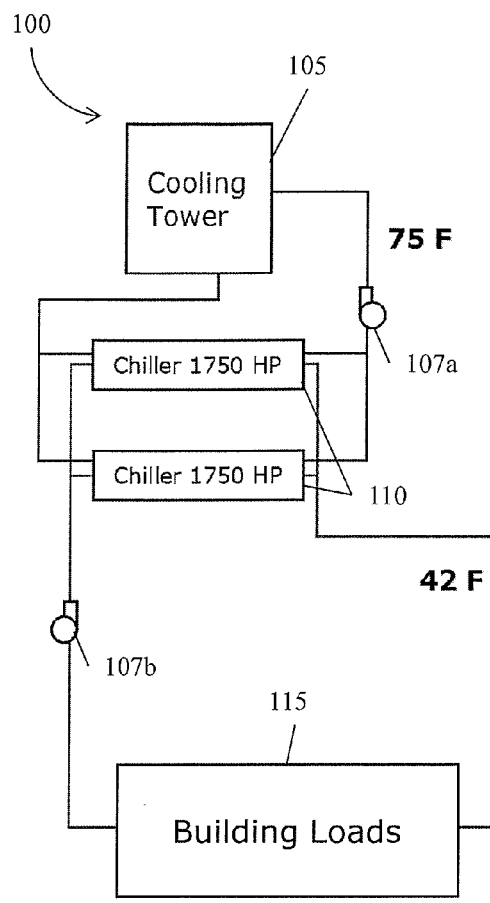
FIG. 2A shows a paid cooling subsystem in accordance with aspects of the present invention.
Figure 2B:
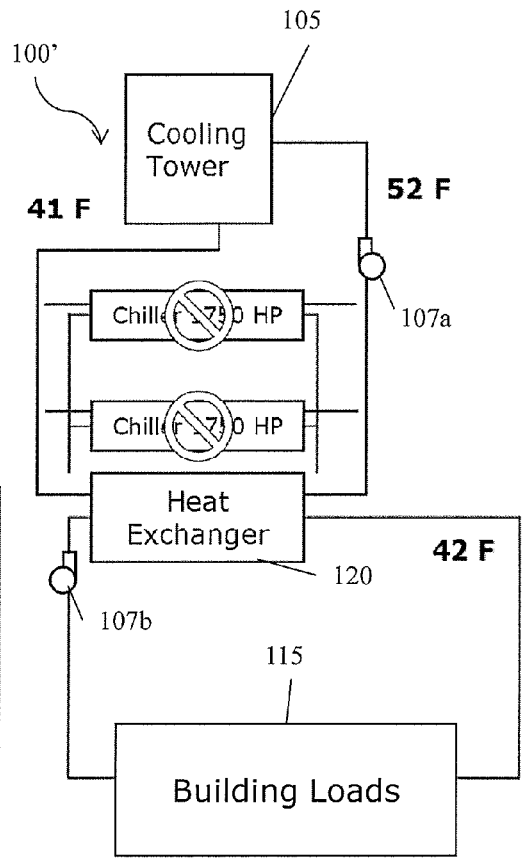
FIG. 2B shows a free cooling subsystem in accordance with aspects of the present invention.

FIGS. 2A and 2B show chilled water systems in accordance with aspects of the present invention. More specifically, FIG. 2A shows a paid cooling subsystem and FIG. 2B shows a free cooling subsystem. As shown in FIG. 2A, a paid cooling subsystem 100 can include a cooling tower 105 coupled to one or more chillers 110 by a pump 107a. For example, the chillers 110 may include one or more 1750 horsepower (HP) chillers; although other chiller sizes or chiller configurations are contemplated by the present invention. In embodiments, the chillers 110 are further coupled to one or more building loads 115, e.g., manufacturing tools and equipment, office space, etc. by a second pump 107b. In this way, the paid cooling subsystem 100 utilizes electrical power, e.g., steam, absorption, etc., chillers to cool water.

In contrast to FIG. 2A, FIG. 2B shows a free cooling subsystem 100'. In particular, as shown in FIG. 2B, the cooling tower 105 is coupled to a heat exchanger 120 by the pump 107a, rather than the one or more chillers (i.e., the chillers 110 of FIG. 2A). The heat exchange is further coupled to the one or more building loads 115 by the second pump 107b. Thus, the free cooling subsystem 100' utilizes outside air to cool water, rather than the electrical power utilized by the paid cooling subsystem 100.

Figure 3:
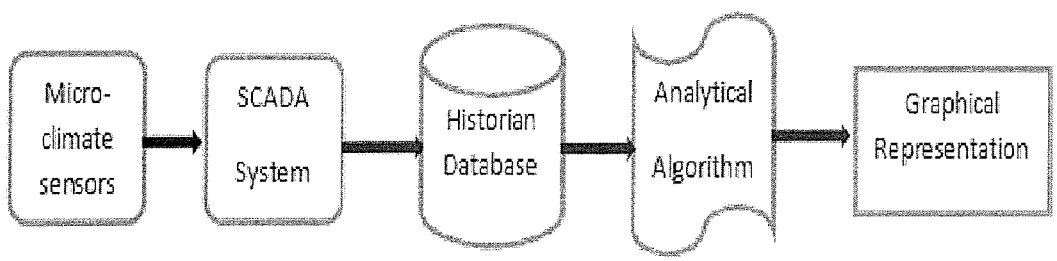
FIG. 3 shows an exemplary flow chart in accordance with aspects of the present invention.

FIG. 3 shows an exemplary flow chart in accordance with aspects of the present invention. More specifically, as shown in FIG. 3, data is collected by one or more micro-climate sensors, as described herein. The data can be provided to a supervisory control and data acquisition system (SCADA) or any other data monitoring system as should be understood by those of ordinary skill in the art. In embodiments, the data can also be provided to a historian database, e.g., storage system 22B of FIG. 1. In this way, the present invention can use historical data to predict future micro-climate conditions.

Furthermore, in embodiments, analytical process flows can used to analyze the data collected from the micro-climate sensors to optimize the use of free cooling subsystems. More specifically, a chiller system energy requirement can be based on equation 1:

$$(P_{CWS})=f\{I, Twb, T_{wb}\} \quad \text{Equation (1).}$$

Where $P_{CWS}$ is the chiller system energy requirement, I is an industrial load, Twb is a regional wet bulb temperature for chilled water system loads, and $T_{wb}$ is a wet bulb temperature of one or more micro-climates enveloping the cooling tower systems. In embodiments, $P_{CWS}$ can be determined using equation 2:

$$P_{CWS}=P_{FC}+P_{Ch} \quad \text{Equation (2).}$$

Where $P_{FC}$ is the power required to make chilled water using the free cooling subsystems measured in KW/ton. In embodiments, $P_{FC}$ can include all energy requirements for pumping subsystems, free cooling subsystems, and/or cooling tower subsystems. $P_{Ch}$ is the power required to make chilled water using the paid cooling subsystems measured in KW/ton. In embodiments, $P_{Ch}$ can include all energy requirements for pumping subsystems, paid cooling subsystems, and/or cooling tower subsystems. In embodiments, when $P_{FC}$ is greater than $P_{Ch}$, the free cooling subsystem is deactivated and the paid cooling subsystem is activated; however, when $P_{FC}$ is less than $P_{Ch}$, the free cooling subsystem is activated in accordance with aspects of the present invention. In this way, the present invention advantageously uses a more cost-efficient cooling subsystem.

Furthermore, in embodiments, the process flows can be used to determine a predicted time Tr to switch off the free cooling subsystem and compare the predicted time Tr with a time required to start and stabilize the paid cooling subsystem Tm, e.g., a reaction time needed to switch from the free cooling subsystem to the paid cooling subsystem. For example, if the free cooling subsystem can be used for an additional 45 minutes and the paid cooling subsystem requires 30 minutes to stabilize, the analytical results can be displayed to the operator (or provided to the control system) indicating that the paid cooling subsystem should be activated in 15 minutes (i.e., 45 minutes–30 minutes). In embodiments, the predicted time to switch off the free cooling subsystem can be established using equation (3).

$$Tr=(T_{SP}-T_{wb}Avg)/VT_{wb}, \text{ when } T_{wb}Avg<Tsp \quad \text{Equation (3).}$$

Tr is the predicted time to switch off the free cooling subsystem, $T_{SP}$ is an empirically derived $T_{wb}$, i.e., an empirically derived wet bulb temperature where free cooling subsystems are more economical than paid cooling subsystems, $T_{wb}Avg$ is the average wet bulb temperature of the micro-climates, i.e., $T_{wb}Avg$=Summation($T_{wb}$)/n (where "n" is the number of micro-climates), and $VT_{wb}$ is a slope of a vector of $T_{wb}$ extrapolated to predict future micro-climate conditions, e.g., a change in temperature/change in time. In embodiments, $T_{wb}Avg$ can be based on the average wet bulb temperature over a period of time, e.g., ten minutes, such that $T_{wb}Avg=T_{wb}Avg(t_0$->$t_{0-10}$ minutes), where $t_0$ is a current time.

In embodiments, when Tr is greater than Tm, instructions are provided to an operator and/or the control system (control system 70 of FIG. 1) to continue using the free cooling subsystem (free cooling subsystem 100' of FIG. 1). Moreover, in embodiments, $VT_{wb}$ can be based on an average in the wet bulb temperature over different periods. For example, as shown in equation (4), $VT_{wb}$ can be based on the average wet bulb temperature over the last ten minutes and the average wet bulb temperature from an hour ago.

$$VT_{wb}=((T_{wb}Avg(t_0-t_{0-10 \text{ minutes}})-T_{wb}Avg(t_{0-60 \text{ minutes}}- t_{0-70 \text{ minutes}}))/(t_0-t_{0-60 \text{ minutes}}) \quad \text{Equation (4).}$$

It should be understood by those of ordinary skill in the art that other extrapolation methods are also contemplated by the present invention. For example, the present invention contemplates other mathematical expressions that can represent the forecast such as, for example, polynomial expressions or logarithmic expressions for extrapolating the data for forecasting purposes. Also, it should be understood that the present invention contemplates other sensors and hence data such as, for example, dew point, solar compensated wet bulb, solar irradiation, etc., and any combinations thereof.

In a non-limiting example, if an average temperature over a most recent period of time, e.g., 10 minutes, is 40° F. and an average temperature from an hour ago is 38° F., then the average change in temperature is 2° F. per hour (i.e., 40°-38°). Furthermore, if $T_{SP}$ is 42° F., $T_{wb}Avg$ is 40°, and $VT_{wb}$ is 2° per hour, then Tr is one hour (i.e., (42°-40°)/2° per hour=1 hour). It should be understood by those of ordinary skill in the art that the average wet bulb temperature over the last ten minutes and the comparison of the wet bulb temperature from an hour ago are used for exemplary purposes only, and that $VT_{wb}$ can be based on any duration of time and different time periods. Moreover, $T_{SP}$ can be any operating temperature required by the facility as should be understood by those of ordinary skill in the art.

In embodiments, as $VT_{wb}$ approaches 0, Tr can be established using boundary conditions. For example, in embodiments, when $VT_{wb}$ is less than or equal to 0, i.e., the micro-climate is getting colder, and $T_{wb}$ is less than $T_{SP}$, Tr can be set to any reasonable time based on operating conditions of the facility, e.g., 4 hours. In alternate embodiments, when $VT_{wb}$ is greater than 0, i.e., the micro-climate is getting warmer, and Tr is greater than a predetermined time, e.g., 4 hours, Tr can be set to any reasonable time based on operating conditions of the facility, e.g., 4 hours. In this way, the present invention can be used to maximize the usage of the free cooling subsystem.

As further shown in FIG. 3, the analytical results of the process flows can be displayed to an operator, e.g., a user, using a graphical interface (display 65 of FIG. 1). As a result, the operator can maximize the usage of the free cooling opportunities, rather than prematurely activating the paid cooling subsystems. In addition, the analytical results can be provided to a control system, which is configured to automatically switch between the free cooling subsystem and the paid cooling subsystem based on the analytical results. That is, the control system can operate the free cooling subsystem when free cooling opportunities are available.

Figure 4:
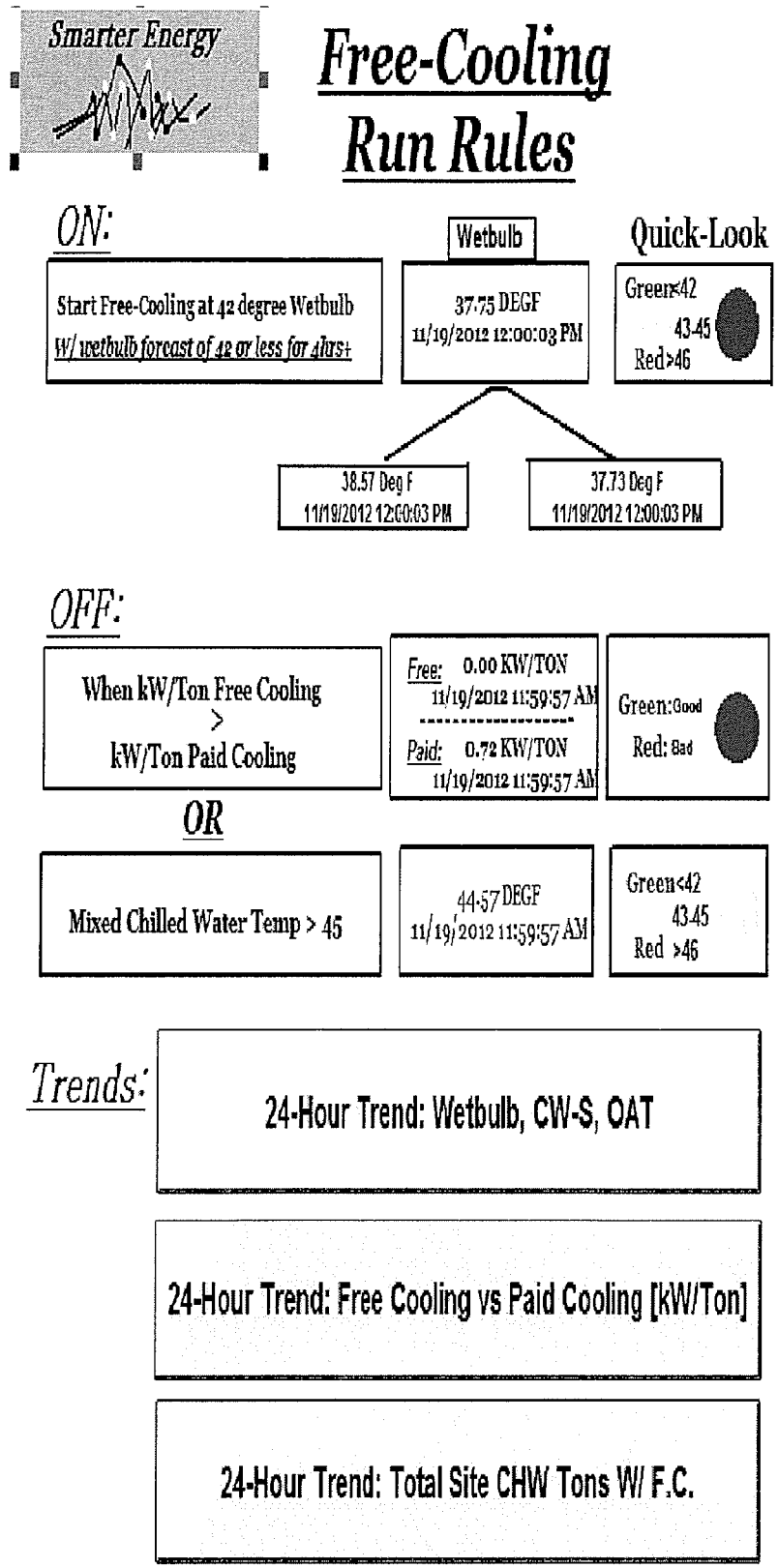
FIG. 4 shows an example visual representation of process flows utilized to analyze micro-climate data in accordance with aspects of the present invention.

FIG. 4 shows an example visual representation utilized to analyze micro-climate data in accordance with aspects of the present invention. More specifically, as shown in FIG. 4, the process flows can be used to establish Free-Cooling Run Rules. For example, the free cooling subsystem can be turned on when a wet bulb is 42° F. or less for four plus hours. In contrast, the free cooling subsystem can be turned off when the power required to operate the free cooling subsystem, e.g., Zone-1, is greater than the power required to operate the paid cooling subsystem, e.g., Zone-4. Alternatively, in embodiments, the free cooling subsystem can be turned off when a mixed chilled water temperature is greater than 45° F. In embodiments, the process flows can be used to predict a time when the wet bulb temperature will be 42° F. or less, as shown in FIG. 4.

As further shown in FIG. 4, one or more trends can be created to display the historical performance of the cooling system. For example, various temperatures; wet bulb, condenser water supply and outdoor air or electrical power consumption for free and paid cooling systems or total site industrial cooling demands.

Figure 5:
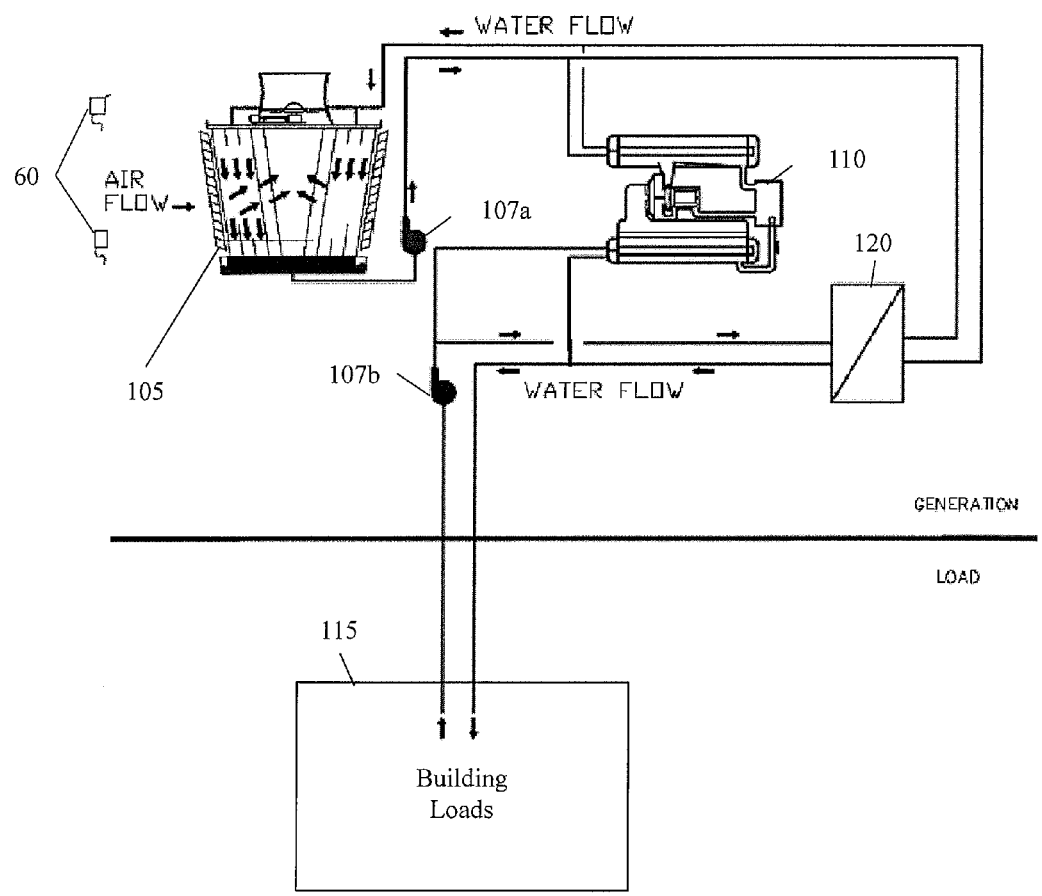
FIG. 5 shows a schematic of equipment used in a cooling system in accordance with aspects of the present invention.

FIG. 5 shows a schematic of equipment used in a cooling system in accordance with aspects of the present invention. More specifically, FIG. 5 shows the cooling tower 105 coupled to the chiller 110 and the heat exchanger 120 by the first pump 107a. The chiller 110 and the heat exchanger are further coupled to the building loads 115 by the second pump 107b. In embodiments, when a free cooling subsystem, e.g., heat exchanger 120, is being operated, water flows through the heat exchanger 120 rather than the chiller 110. In contrast, when a paid cooling system, e.g., chiller 110, is being operated, water flows through the chiller 110 rather than the heat exchanger 120.

As further shown in FIG. 5, one or more sensors 60 are located in the vicinity of the cooling tower 105 and are configured to climate micro-climate data surrounding the cooling tower 105, e.g., on a generation side of a cooling system. The sensors can be, for example, relative humidity sensors, temperature sensors wet bulb sensors, and/or a host of other climate sensors known to those of skill in the art. In this way, according to aspects of the present invention, decisions regarding the operation of the cooling system can be based on the generation side of the coolant system rather than a load side of the coolant system. Also, utilizing the data from the sensors, the systems and processes of the present invention can make real time decisions, and can predict with more accuracy, future conditions of the microclimate.

Flow Diagram

Figure 6:
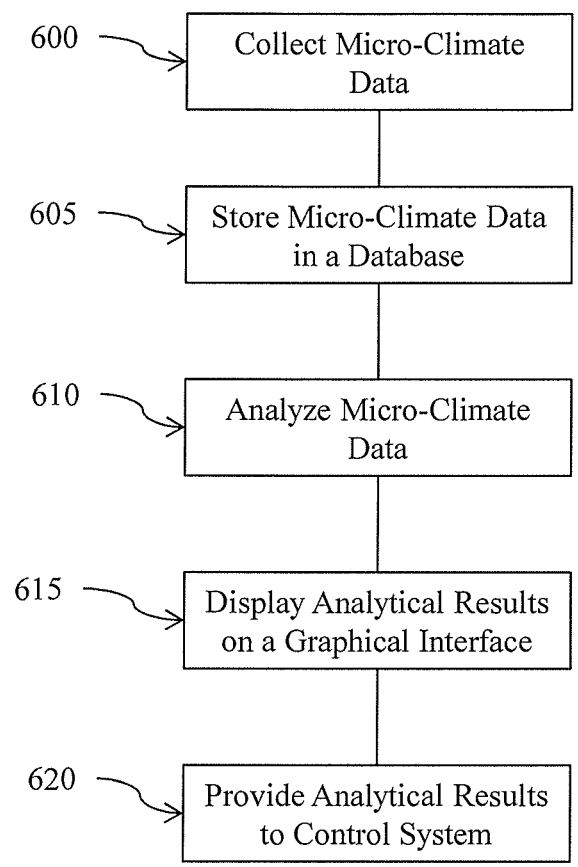
FIG. 6 shows an exemplary flow chart for performing aspects of the present invention.

FIG. 6 shows an exemplary flow for performing aspects of the present invention. The steps of FIG. 6 may be implemented in the environment of FIG. 1, for example. The flowchart and block diagrams in the Figure illustrate the architecture, functionality, and operation of possible implementations of systems, methods and computer program products according to various embodiments of the present invention. In this regard, each block in the flowchart or block diagrams may represent a module, process window segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 6 depicts an exemplary flow for a process in accordance with aspects of the present invention. As shown in FIG. 6, at step 600, the process includes collecting micro-climate data from one or more sensors, as described herein. At step 605, the process further includes storing the micro-climate data in a storage database, e.g., database 22 of FIG. 1, and at step 610, analyzing the micro-climate data to determine the optimal usage of free cooling subsystems, as described herein. In embodiments, the process includes, at step 615, displaying analytical results of the process flows to an operator using a graphical interface, such that the operator can determine when to switch from free cooling subsystems to paid cooling subsystems and vice-versa. In addition, or alternatively, at step 620, the process includes providing the analytical results to a control system used to start/stop free cooling and paid cooling subsystems in a combined cooling system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:
1. A method comprising:
  collecting micro-climate data from one or more sensors surrounding a facility;
  analyzing the micro-climate data; and
    wherein the analyzing the micro-climate data comprises comparing a power required to operate a free cooling subsystem with a power required to operate a paid cooling subsystem;
  making a determination to operate the free cooling subsystem or the paid cooling subsystem based on the analysis of the micro-climate data, wherein, in determining when to switch from the free cooling subsystem to the paid cooling subsystem, the analyzing of the micro-climate data further comprises:

determining a predicted time to switch off the free cooling subsystem; and comparing the predicted time to switch off the free cooling subsystem with a reaction time to activate the paid cooling subsystem, wherein the paid cooling subsystem is activated based on a time difference between the predicted time to switch off the free cooling subsystem and the reaction time to activate the paid cooling subsystem, and wherein the predicted time to switch off the free cooling subsystem is based on a change in temperature over a change in time.

2. The method of claim 1, further comprising displaying analytical results of the micro-climate data on a graphical display.

3. The method of claim 1, further comprising providing analytical results to a control system, which is configured to switch between the free cooling subsystem and the paid cooling subsystem based on analytical results of the micro-climate data.

4. The method of claim 1, wherein the free cooling subsystem is operated when the power required to operate the free cooling subsystem is less than the power required to operate the paid cooling subsystem.

5. The method of claim 1, further comprising setting boundary conditions when the change in temperature over a change in time approaches zero.

6. The method of claim 1, wherein the analyzing the micro-climate data is performed in real-time and on a continuous basis.

7. The method of claim 1, wherein the change in temperature over the change in time comprises a first average wet bulb temperature at a first time and a second average wet bulb temperature at a second time.

8. A cooling system comprising:

one or more paid cooling subsystems and one or more free cooling subsystems;

at least one sensor which monitors a micro-climate in a vicinity of a cooling tower and is configured to collect the micro-climate data; and at least one component operable to analyze the micro-climate data and determine that free cooling opportunities are available;

wherein the analyzing the micro-climate data comprises comparing a power required to operate the one or more paid cooling subsystems and a power required to operate the one or more free cooling subsystems, wherein, in determining when to switch from the free cooling subsystem to the paid cooling subsystem, the analyzing of the micro-climate data further comprises:

determining a predicted time to switch off the free cooling subsystem; and comparing the predicted time to switch off the free cooling subsystem with a reaction time to activate the paid cooling subsystem, wherein the paid cooling subsystem is activated based on a time difference between the predicted time to switch off the free cooling subsystem and the reaction time to activate the paid cooling subsystem, and wherein the predicted time to switch off the free cooling subsystem is based on a change in temperature over a change in time.

9. The cooling system of claim 8, wherein the analyzing the micro-climate data further comprises:

determining a predicted time to switch off the one or more free cooling subsystems; and comparing the predicted time to switch off the one or more free cooling subsystems with a reaction time to activate the one or more paid cooling subsystems.

10. The cooling system of claim 9, further comprising a graphical display configured to display when the free cooling opportunities are available, such that an operator maximizes usage of the one or more free cooling subsystems.

11. The cooling system of claim 9, further comprising a control system configured to automatically switch between the one or more paid cooling subsystems and the one or more free cooling subsystems based on the analysis of the micro-climate data, wherein the one or more free cooling subsystems are utilized when the free cooling opportunities are available.

12. The cooling system of claim 9, wherein the one or more paid cooling subsystems is activated based on a time difference between the predicted time to switch off the free cooling subsystem and the reaction time to activate the paid cooling subsystem.

13. The cooling system of claim 9, wherein the analyzing the micro-climate data further comprises analyzing one or more micro-climate conditions on a 100 meter grid.

14. A computer system for optimizing usage of a free cooling subsystem, the system comprising:

a CPU, a computer readable memory and a computer readable storage media;

first program instructions to collect micro-climate data from one or more sensors;

second program instructions to analyze the micro-climate data;

wherein the analyzing the micro-climate data comprises comparing a power required to operate a free cooling subsystem with a power required to operate a paid cooling subsystem;

third program instructions to operate the free cooling subsystem based on the analysis of the micro-climate data, wherein the first, second, and third program instructions are stored on the computer readable storage media for execution by the CPU via the computer readable memory, wherein, in determining when to switch from the free cooling subsystem to the paid cooling subsystem, the analyzing of the micro-climate data further comprises:

determining a predicted time to switch off the free cooling subsystem; and comparing the predicted time to switch off the free cooling subsystem with a reaction time to activate the paid cooling subsystem, wherein the paid cooling subsystem is activated based on a time difference between the predicted time to switch off the free cooling subsystem and the reaction time to activate the paid cooling subsystem, and wherein the predicted time to switch off the free cooling subsystem is based on a change in temperature over a change in time.

15. The computer system of claim 14, wherein the free cooling subsystem is operated when the powered required to operate the free cooling subsystem is less than the power required to operate the paid cooling subsystem.

16. The computer system of claim 15, wherein the analyzing the micro-climate data further comprises:
- determining an availability of free cooling opportunities; and
- comparing the availability of free cooling opportunities with a reaction time to activate the paid cooling subsystem, wherein the paid cooling subsystem is activated based on a time difference between the availability of free cooling opportunities and a reaction time to activate the paid cooling subsystem.

17. The computer system of claim 16, further comprising:
- fourth program instructions to display when the free cooling opportunities are available on a graphical interface; and
- fifth program instruction to display the micro-climate conditions from the one or more sensors, including one or more sensors at one or more chillers.

* * * * *